(No Model.)　　　　　　　　　　　　　　　　5 Sheets—Sheet 1.
S. L. DENNEY.
COMBINED HAY TEDDER AND RAKE.
No. 312,336.　　　　　　　　　Patented Feb. 17, 1885.
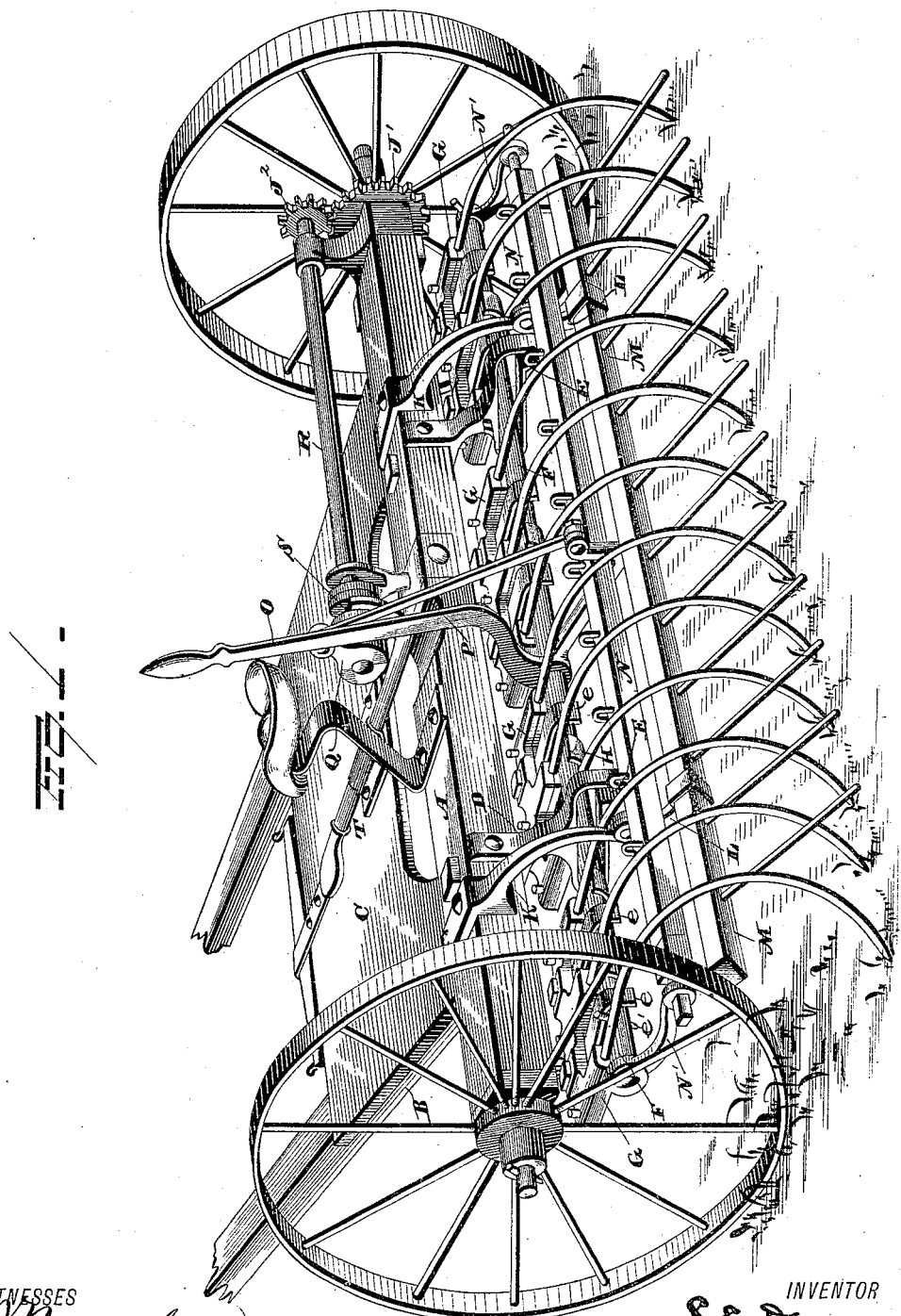

(No Model.) 5 Sheets—Sheet 2.
S. L. DENNEY.
COMBINED HAY TEDDER AND RAKE.
No. 312,336. Patented Feb. 17, 1885.
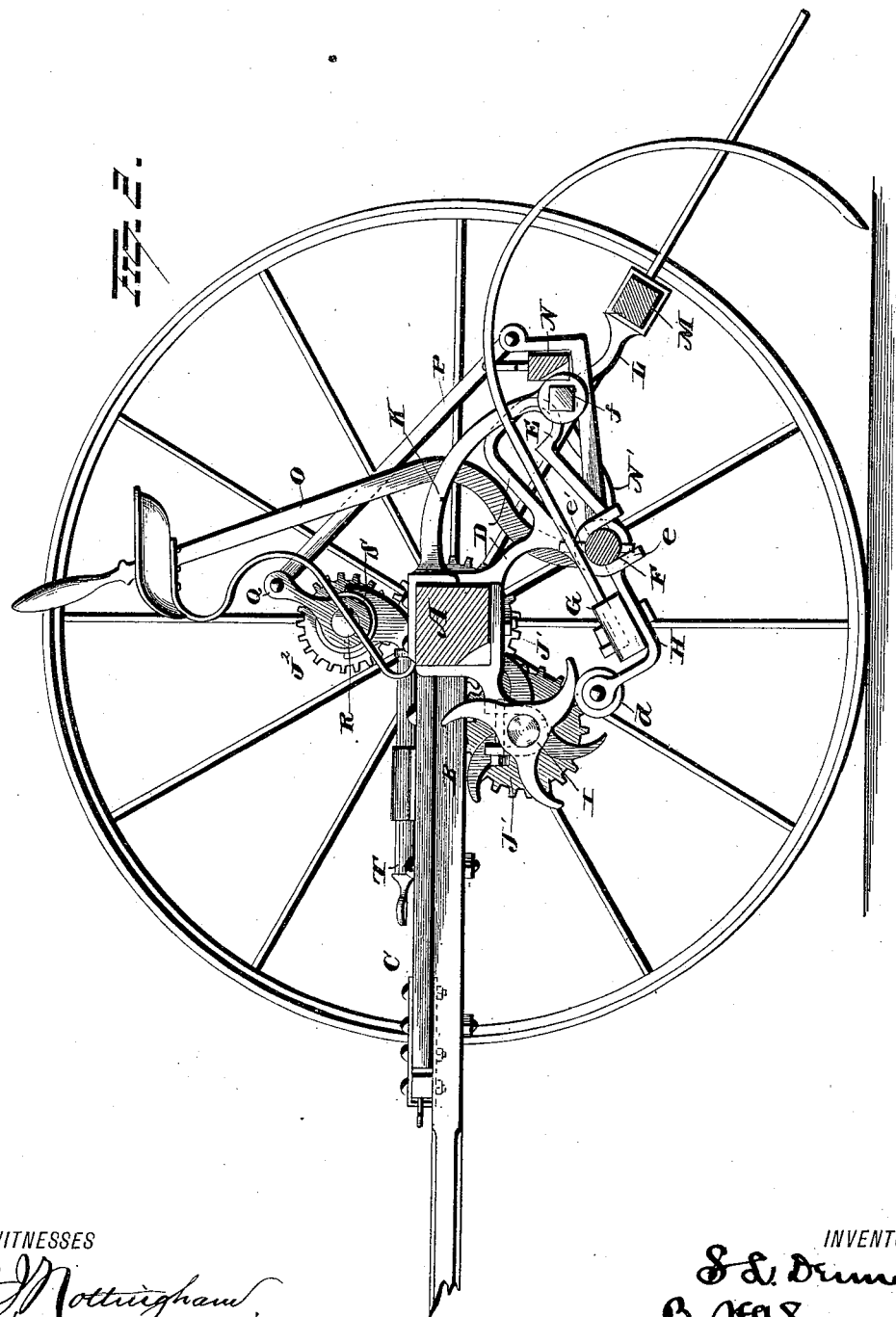
WITNESSES
INVENTOR
Attorney (No Model.)
S. L. DENNEY.
COMBINED HAY TEDDER AND RAKE.
No. 312,336.  Patented Feb. 17, 1885.
5 Sheets—Sheet 3.
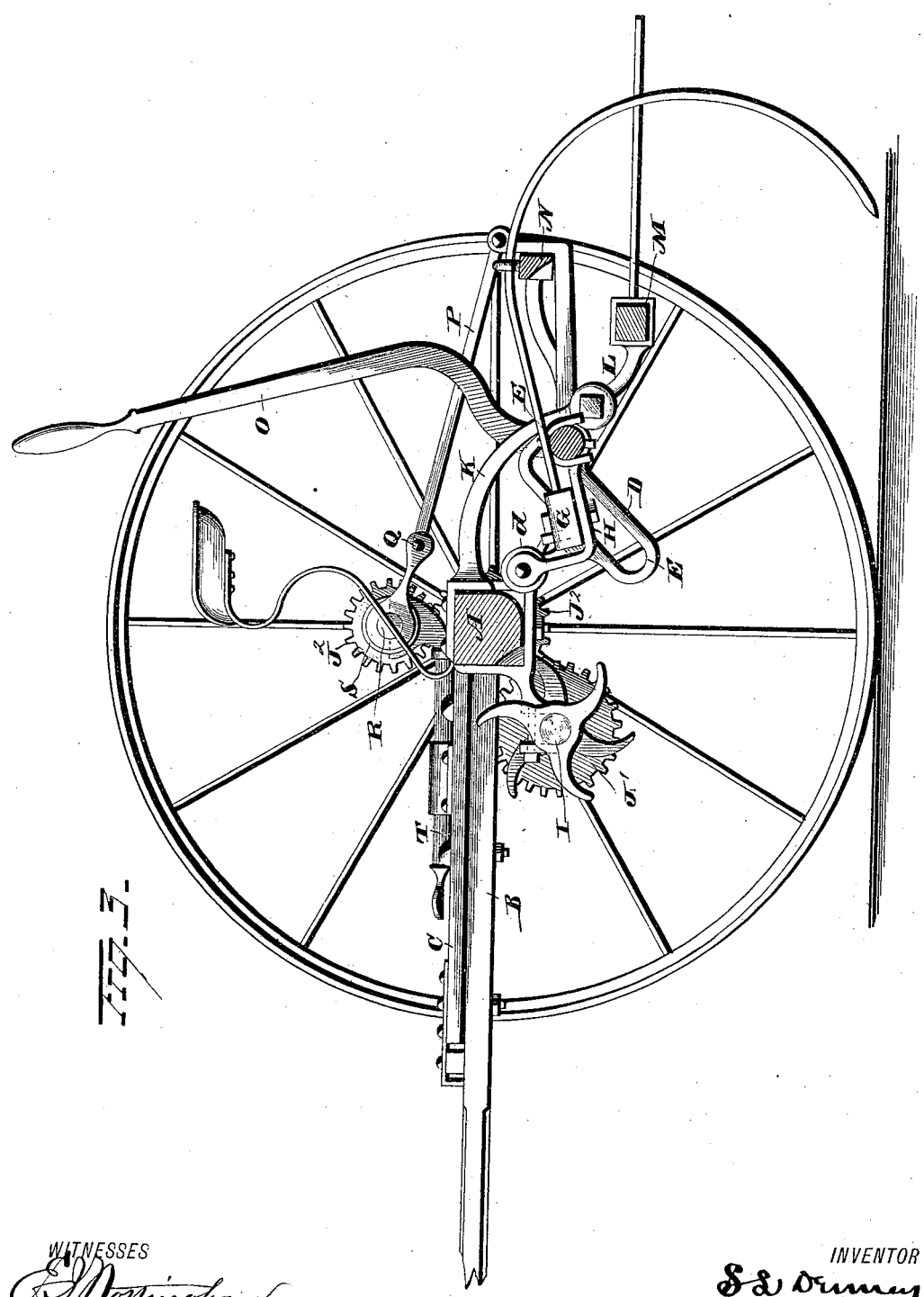
WITNESSES
E. Nottingham
George F. Downing
INVENTOR
S. L. Denney
By H. A. Seymour,
Attorney (No Model.)  S. L. DENNEY.  5 Sheets—Sheet 4.
COMBINED HAY TEDDER AND RAKE.
No. 312,336.  Patented Feb. 17, 1885.
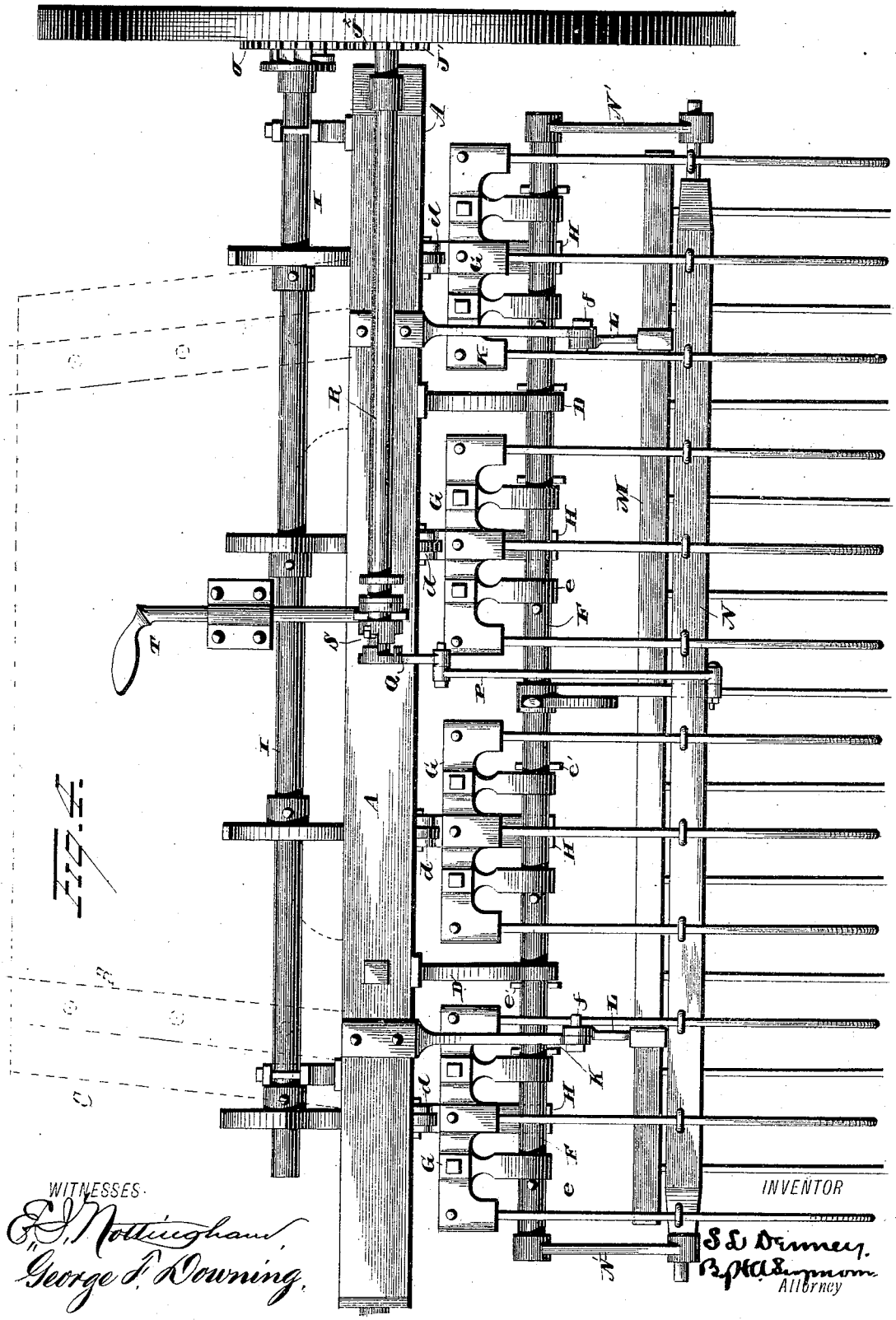
WITNESSES
INVENTOR (No Model.) 5 Sheets—Sheet 5.
S. L. DENNEY.
COMBINED HAY TEDDER AND RAKE.
No. 312,336. Patented Feb. 17, 1885.
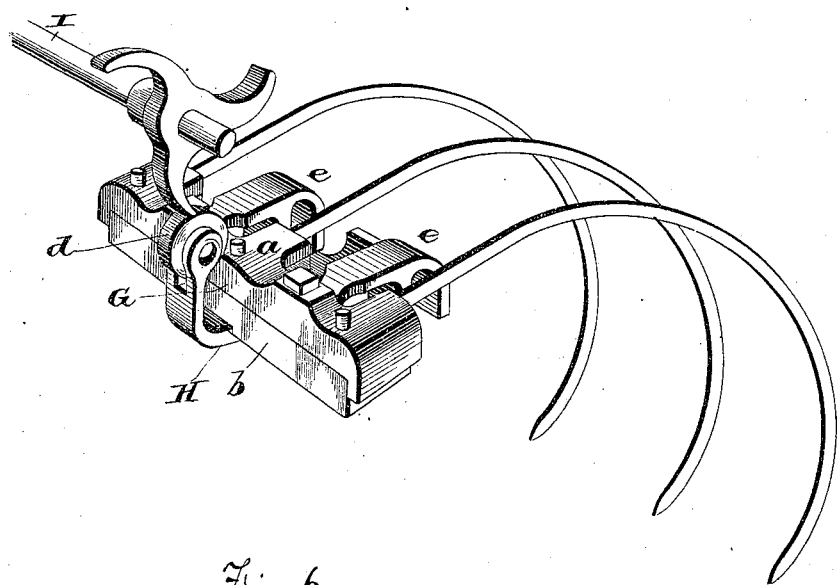
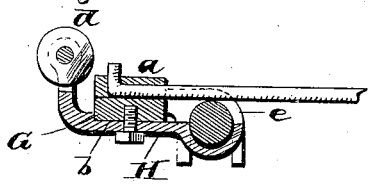
WITNESSES
INVENTOR

UNITED STATES PATENT OFFICE.

SAMUEL L. DENNEY, OF STRASBURG, PENNSYLVANIA.

COMBINED HAY TEDDER AND RAKE.

SPECIFICATION forming part of Letters Patent No. 312,336, dated February 17, 1885.

Application filed March 7, 1884. (No model.)

*To all whom it may concern:*

Be it known that I, SAMUEL L. DENNEY, of Strasburg, in the county of Lancaster and State of Pennsylvania, have invented certain new and useful Improvements in Combined Hay Tedders and Rakes; and I do hereby declare the following to be a full, clear, and exact description of the invention, such as will enable others skilled in the art to which it appertains to make and use the same.

My invention relates to an improvement in combined hay tedders and rakes.

In the hay-tedders now in use a series of forks are journaled on a multiple crank-shaft, and operate so as to throw the straw backward and spread it over the surface of the ground. This method of loosening the hay is objectionable in that the rapid movement of the forks not only breaks the tender part of the hay off, but also exposes the entire mass to the sun and dew, the former of which burns the hay, while the latter blackens it and greatly impairs the quality thereof.

The object of my invention is to overcome these objections by providing a tedder so constructed that the teeth thereof will move in close contact with the ground, and engage the hay and carry it forward for a short distance, then automatically discharge it and fall and gather another flake, and so on continuously. This method of gathering the hay into loose flakes permits the air to pass readily through the mass and carry off the moisture without exposing the entire mass to the scorching rays of the sun.

A further object of my invention is to provide an improved tedder that can be converted into a rake without the necessity of removing any of the parts. A further object is to provide improved means for dumping the rake; and with these ends in view my invention consists in the parts and combinations of parts, as will be more fully described, and pointed out in the claims.

In the accompanying drawings, Figure 1 is a view in rear perspective, showing the teeth in position for operating as a tedder. Fig. 2 is a transverse vertical sectional view of the same. Fig. 3 is a similar view showing the teeth in position for operating as a rake. Fig. 4 is a plan view of the machine with the platform removed, the teeth being shown in position for operating as a rake. Fig. 5 is a perspective view of a portion of the cam-shaft and one of the tooth-sections, and Fig. 6 is a vertical transverse sectional view of the same.

A represents the axle, preferably made of wood, and provided at opposite ends with metal spindles, to which the ground-wheels are journaled. The thills B are secured to this axle and form supports, to which the platform C is secured. This axle A is provided on its rear or lower side with the rearwardly-inclined brackets D, the rear ends of which are considerably enlarged and provided with elongated inclined slots E, which latter terminate at their upper ends in semi-cylindrical bearings, in which the shaft F, bearing the teeth-heads, rests when the teeth are operating as a rake. These brackets (preferably two) support the shaft F, on which the teeth-sections are loosely journaled. Each section is preferably provided with three teeth, curved as shown, the front ends of which are rigidly secured to the heads G. These heads G are preferably made of cast metal and in two sections, $a$ and $b$, which are secured together by bolts, and firmly clamp the ends of the teeth between them. The upper section, $a$, of each head is provided with two rearwardly-extending arms, $e$, which latter are bent or curved downwward at their rear ends, so as to overhang the shaft F. A plate, H, is secured to the under side of each head G, and is provided at its rear end with a semi-cylindrical bearing, which partly encircles the shaft F and holds the teeth-heads thereon, and is provided at its front end with an anti-friction roller, $d$, against which the cam or tappet wheel strikes while the machine is operating as a tedder. This plate H is secured to its head by a single bolt, by removing which the head can be removed from the shaft F. This plate H is the only part of the machine that is subjected to any great strain, and hence if it should be accidentally broken a new one could be supplied at a slight cost. A series of these sections are arranged on the shaft F side by side, and are prevented from moving laterally by the pins $e'$, which are inserted through holes formed in the shaft and bear against the heads. Each section is, as before stated, provided at its front end with an anti-friction roller, which rollers engage their respective tappet-wheels when the shaft F rests in the lower end of the slots E of the brackets D. The shaft I is journaled in bearings secured to the front of the axle, and is provided with a single tappet-wheel for each tooth-section.

I do not limit myself to a tappet-wheel having any particular number of spokes or arms, but I have found that a tappet-wheel moving each tooth-section three times to each revolution of the driving-wheel gives the best results, and by so gearing the shaft I that it revolves once with each revolution of the driving-wheel, and providing each tappet-wheel with three arms, the above result is obtained. The tappet-wheels are so secured to the shaft relatively to each other that the arms thereof strike the anti-friction rollers at different times, so that while one section is moving in contact with the ground another section will be rising and another section falling, and so on continuously.

To one end of the shaft I is loosely journaled the pinion J, which latter is provided with a pawl which engages a ratchet-wheel rigidly secured to the shaft I. This arrangement allows the machine to be backed without turning the shaft I, and consequently prevents the arms of the tappet-wheel from turning up against the under face of the anti-friction rollers and becoming wedged. The wheel J can be slid on the shaft I, so as to be disengaged from the pinion J', rigidly secured to the driving-wheel, when the machine is being worked as a rake. The wheels J and J' are equal in size, and consequently the shaft I is turned simultaneously with the driving-wheel. The axle A is also provided with the two rearwardly-extending brackets K, which latter curve downward, and are provided at their lower ends with slightly-enlarged heads having bolt-holes formed therein. To these heads the arms L are adjustably secured by the bolts $f$, the outer ends of the said arms being rigidly secured to the clearer-head M. This clearer-head is provided with a series of straight teeth, which latter rest between the teeth of the combined tedder and rake and remove any hay adhering thereto.

When the machine is operating as a tedder, the upward movement of the teeth is not so great as the movement of the teeth when operating as a rake, and hence the clearing-teeth have to be turned downward at an angle, so as to remove all the hay. While the machine is operating as a rake, the clearer-teeth rest in or approximately in a horizontal plane. If the shaft F should be resting in the semicircular bearings at the upper ends of the elongated heads of the brackets D, and it is desired to convert the machine into a tedder, it is simply necessary to move the shaft out of the semicircular bearings, and allow it to slide down the inclined slots E until it rests in its lowest position. This brings the anti-friction rollers journaled to the heads of the teeth, sections into contact with the tappet-wheels and as the latter revolve the sections are operated, as before described. The rear ends of the teeth are supported and held in proper position by the bar N, which is secured to the arms N', rigidly secured to the shaft F. This bar N rests under the teeth and can be adjusted vertically to regulate the fall of the teeth, and thereby prevent the latter from engaging or coming into direct contact with the ground and dragging up stubble or trash and mixing it with the hay.

When the machine is being operated as a tedder, the rear ends of the teeth pass upward in nearly a vertical line, and do not consequently form a seat on which any hay could rest. When the machine is moving forward, the shaft I alternately elevates the rear ends of the teeth-sections and discharges the hay held thereby, and leaves the mass in an open condition, through which the air can penetrate and carry off the moisture, while only the outer surface of the mass is exposed to the rays of the sun, and hence the hay in the interior of the mass retains its green color and is more perfectly cured, and consequently of a better quality.

To convert this tedder into a rake it is simply necessary to move the shaft up the inclined slot E in the brackets D until it rests in the semicircular bearings formed at the upper end of the slot. This carries the heads away from the tappet-wheels, and hence the movements of the latter do not affect the teeth-sections.

The bar N, before referred to, is provided on its upper face with a series of hooks or open staples, which, when the machine is operating as a tedder, rest at one side of the teeth and allow the several sections to rise alternately; but when the machine is used as a rake it is necessary that the whole series of teeth should be elevated and lowered simultaneously. This is accomplished by sliding the bar N longitudinally until the hooks or staples $g$ rest over the teeth and lock the whole of the series together. This bar N is connected to the lever O, journaled on the shaft F, by means of which the teeth can be elevated to enable them to ride over an obstruction, and is also connected to the rear end of the pitman P, the front end of which is connected to the crank Q, loosely journaled on the shaft R. This shaft R is journaled in bearings on the upper face of the axle, and is provided with the pinion $J^2$, meshing with the pinion J' of the driving-wheel. S is a spring-actuated clutch sliding longitudinally on the shaft R and operated by the foot-lever T. The clutch is moved into contact with the hub of the crank Q, which is serrated or notched for the purpose, and locks the crank to the shaft and causes it to dump automatically. This arrangement not only raises the teeth steadily, but also lowers them at the same rate of speed, and thereby prevents the teeth from being broken or injured by suddenly dropping, as they do in all hay-rakes now in use.

This device is exceedingly simple in construction, is durable and effective in use, and can be manufactured at a cost less than the ordinary tedders now employed.

It is evident that many slight changes in the construction and relative arrangement of the several parts might be resorted to without departing from the spirit of my invention, and hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. In a hay-tedder, the combination, with a shaft, sectional teeth-heads, each having a series of teeth removably secured therein, and arms projecting rearwardly from said heads and embracing said shaft, of a rotary shaft and tappets secured thereon and engaging the teeth-heads, substantially as set forth.

2. In a combined hay rake and tedder, the combination, with a frame, rigid bearings depending from the frame, a shaft adapted to be adjusted backward and forward in said bearings, and a series of teeth-heads carrying teeth and journaled on said shaft, of a shaft secured to the frame, and tappet-wheels secured on said shaft and adapted to raise and lower the teeth when the shaft carrying the teeth-heads is in forward adjustment.

3. In a combined hay tedder and rake, the combination, with a frame, brackets depending from the frame, and bearings formed, respectively, in the front and rear ends of said brackets and communicating with each other, of a shaft supported by said brackets and adapted to be moved from one bearing to the other, teeth-heads journaled on said shaft and carrying teeth, and a shaft located in front of the brackets and carrying tappet-wheels adapted to engage the tooth-heads when the shaft is located in the front bearings of the brackets, substantially as set forth.

4. In a combined hay tedder and rake, the combination, with the axle and brackets secured thereto, the latter provided with elongated slots and semicircular bearings, of the shaft adjustable in said brackets, teeth-heads journaled to the shaft, and devices for elevating and lowering the teeth when the machine is used as a tedder, substantially as set forth.

5. In a combined hay tedder and rake, the combination, with a series of teeth-heads and teeth secured to said heads, of a longitudinally-sliding bar situated under the teeth and provided with hooks or open staples, whereby the entire set of teeth can be locked together to adapt them for raking.

6. In a combined hay tedder and rake, the combination, with a series of teeth-heads, each of which is provided with teeth, of the bar N, situated under the teeth and provided with staples, whereby the whole set of teeth can be locked together, and a lever for elevating the bar, substantially as set forth.

7. In a combined rake and tedder, the combination, with an axle, bearings depending from said axle, a shaft adapted to be adjusted backward and forward in said bearings, teeth-heads loosely mounted on said shaft, and teeth secured to the heads, of a bar located below the teeth and adjustably secured to the axle, and provided with a series of rearwardly-projecting clearing-teeth, which latter rest between the tedder and rake teeth, substantially as set forth.

8. In a combined hay rake and tedder, the combination, with an axle, bearings depending from said axle, a shaft adjustable in said bearings, teeth-heads journaled on said shaft and provided with teeth, tappet-wheels for engaging the teeth-heads when the machine is operating as a tedder, and a bar located under the teeth, of a ground-wheel having a pinion thereon, a shaft provided at one end with a pinion engaging the pinion on the driving-wheel, and at its opposite end with a loose crank, a pitman connecting the bar under the teeth with the loose crank, a clutch for locking the crank to the shaft, and a foot-lever for operating the clutch, substantially as set forth.

In testimony whereof I have signed this specification in the presence of two subscribing witnesses.

SAMUEL L. DENNEY.

Witnesses:
S. G. NOTTINGHAM,
C. S. DRURY.